Aug. 30, 1960

C. I. BOHLEN 2,950,690

FREIGHT HANDLING SYSTEM

Filed July 11, 1957

INVENTOR.
CHARLES I. BOHLEN

BY Curtis, Morris & Safford

ATTORNEY

Aug. 30, 1960  C. I. BOHLEN  2,950,690
FREIGHT HANDLING SYSTEM
Filed July 11, 1957  4 Sheets-Sheet 2

INVENTOR.
CHARLES I. BOHLEN
BY Curtis, Morris & Safford
ATTORNEYS

Aug. 30, 1960   C. I. BOHLEN   2,950,690
FREIGHT HANDLING SYSTEM
Filed July 11, 1957   4 Sheets-Sheet 3

INVENTOR.
CHARLES I. BOHLEN
BY Curtis, Morris & Safford
ATTORNEY

Aug. 30, 1960

C. I. BOHLEN 2,950,690

FREIGHT HANDLING SYSTEM

Filed July 11, 1957

INVENTOR.
CHARLES I. BOHLEN
BY Curtis, Morris & Safford
ATTORNEY

United States Patent Office 2,950,690
Patented Aug. 30, 1960

2,950,690

FREIGHT HANDLING SYSTEM

Charles I. Bohlen, Doylestown, Pa., assignor, by mesne assignments, to Flexi-Van, Inc., a corporation of Delaware Filed July 11, 1957, Ser. No. 671,277

1 Claim. (Cl. 105—368)

This invention relates to apparatus for transferring loaded trailer bodies between highway wheel assemblies and railroad cars or other carriers so that the freight contained in said trailer bodies can be transported by a combination of highway and rail or other media of transportation without unloading.

In the copending applications Serial No. 637,462, filed January 31, 1957, and Serial No. 658,094, filed May 9, 1957 (both owned by the same assignee as the present application), there is disclosed a system wherein the trailer body is slid longitudinally off of the highway wheel assembly onto a turntable rotatably mounted on top of the railroad cars, the turntable being oriented transversely of the cars during such transfer, and being rotatable to align the long axis of the trailer body and the railroad car for transit. The truck tractor supplies the motive power for pushing or pulling the trailer body onto or off the railroad car. This system thus has the advantage that no extraneous equipment such as hoists, lift trucks, ramps or the like need be provided at the point where the transfer is effected. However, since the transfer is made with the trailer body oriented transversely of the car, this system does require a clear area with a relatively flat surface extending at at least one side of the railroad track for a distance at least equal to the length of the trailer body and tractor, plus the space required for turning—i.e. a distance of the order of 50 to 60 feet.

It is among the objects of the present invention to provide freight handling apparatus so constructed and arranged that the width of the clear space required alongside the railroad car or other carrier to or from which the transfer is effected is reduced to a distance not substantially greater than the width of the trailer body itself—i.e. of the order of 10 feet. It is a further object of this invention to provide such apparatus which is of economical and durable construction and simple and reliable in operation, and whereby the transfer from one carrier to another can be effected quickly and without extraneous equipment.

In general terms, the present invention accomplishes these objectives by providing a system wherein the trailer bodies are moved laterally to transfer them from the highway wheel assemblies to the railroad cars and vice versa. The trailer body is equipped with rollers which move along rails mounted at the top of retractable outriggers which extend perpendicularly from the sides of the railroad car. Hydraulic rams are provided to raise the tracks on the outriggers and lift the trailer body out of interlocking engagement with the highway wheel assembly prior to the lateral movement, these rams being retracted when the trailer bodies are in proper position over the railroad car to lower the trailer body into interlocking relation with the car.

Figures 7 to 10 inclusive are fragmentary side elevational views of the latch mechanism with the inner parts shown in broken lines to illustrate their movement under various conditions of operation.

Figure 11:
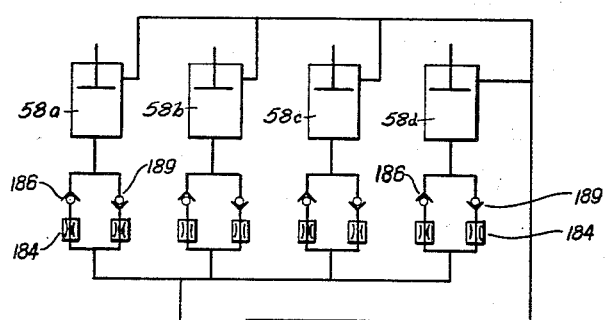
Figure 11:
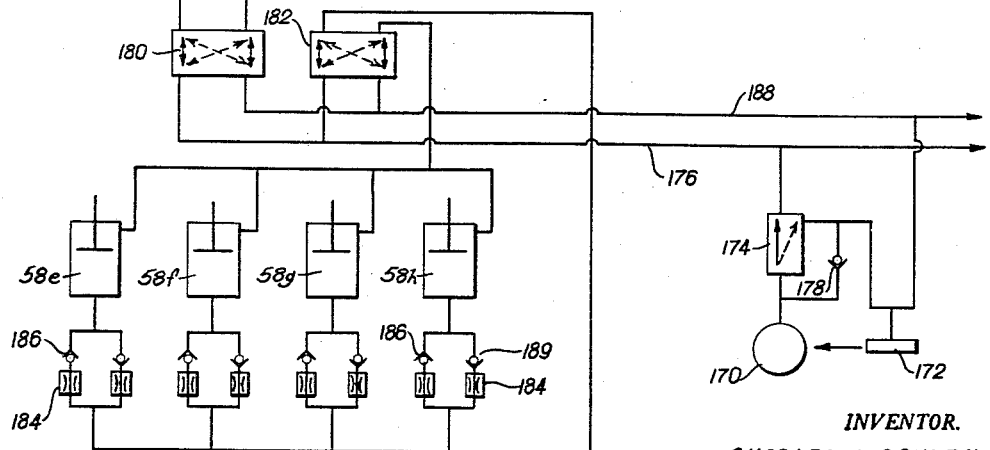

Figure 11 is a schematic diagram showing the hydraulic system for raising and lowering the outriggers of the railroad car.

Figure 1:
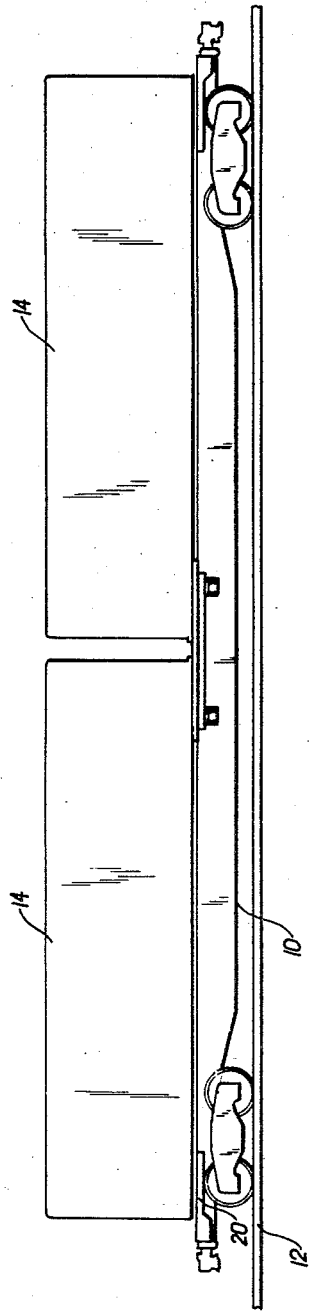
Figure 1 is a side elevational view of a railroad car embodying features of the present invention with a pair of trailer bodies shown in proper position thereon for transit.

In Figure 1, a railroad car 10 on the rails 12 is shown with a pair of trailer bodies 14 in proper transit position thereon. While in the particular embodiment shown in this application, the railroad car is adapted to handle two trailer bodies, the principles of the invention are equally applicable to embodiments wherein the railroad car is adapted to handle only one or three or more trailer bodies.

Figure 2:
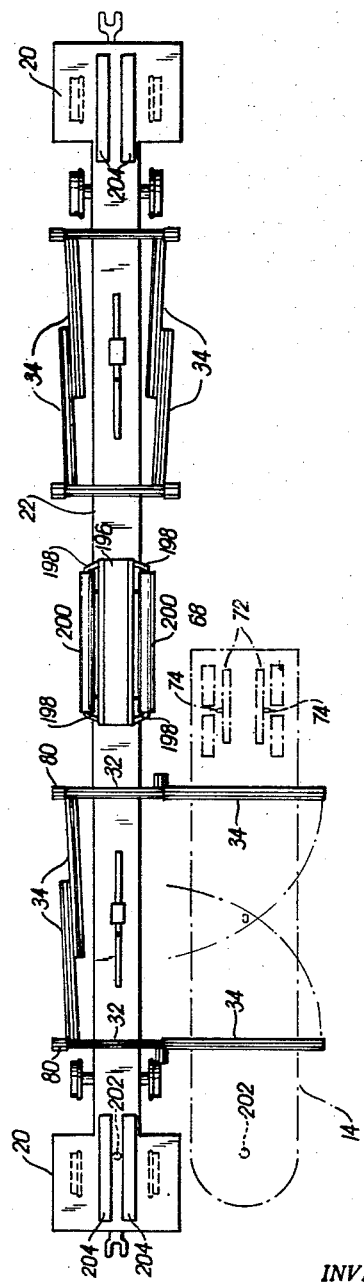
Figure 2 is a top plan view of the railroad car shown in Figure 1, with the trailer bodies removed and with one pair of the outriggers extended.

As may be seen in Figure 2, the railroad car is provided with end platforms 20 of normal car width and with an intermediate section of substantially reduced width. As may be seen in Figure 3, the intermediate section 22 is in effect a composite girder formed of spaced longitudinal beams 24 with upper and lower plates 26 and 28, respectively, welded thereto. As may also be seen in this figure, the trailer body 14 is provided at its underside with two longitudinally spaced pairs of transversely spaced rollers 30 which are arranged and oriented to support the trailer bodies for transverse rolling movement. As may be seen in Figure 2, each half of the railroad car is provided at its upper surface with a pair of rails 32 which extend parallel to each other and transversely of the car and are spaced apart the same distance as the two pairs of rollers 30 on the bottom of the trailer body to support and guide these rollers for transverse movement of the trailer body.

To support the trailer body 14 during its movement onto and off of the car 10, there are provided at each side of each end of the car a pair of outrigger assemblies generally designated 34 (Figure 2) each of which is pivotally mounted on the side of the car so that it may be swung from a retracted position at which it extends along the side of the car and an extended position at which the two outrigger assemblies extend parallel to each other and perpendicular to the car.

Figure 3:
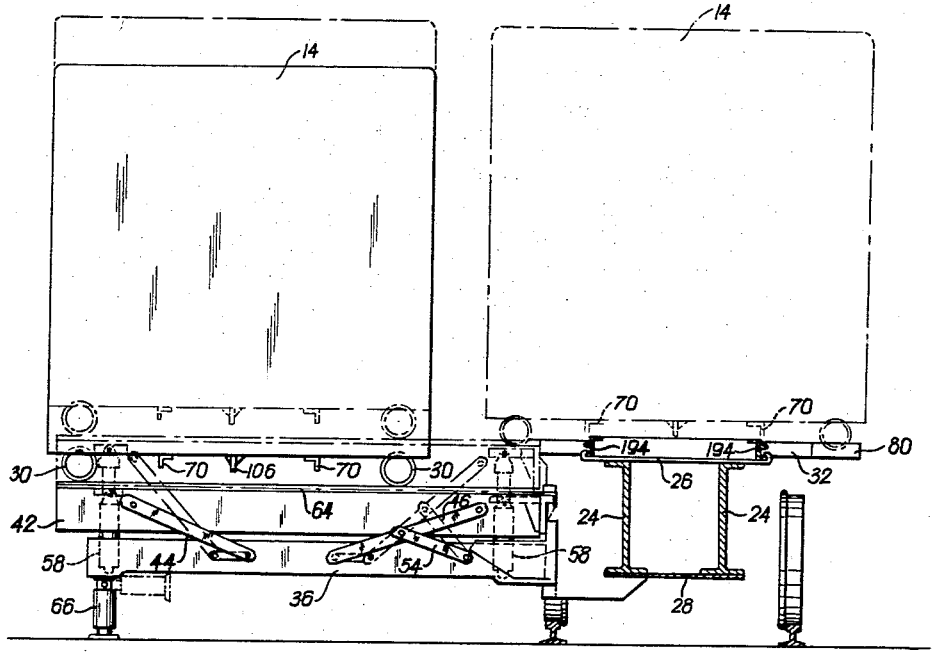
Figure 3 is a transverse sectional view taken through the railroad car of Figures 1 and 2 adjacent one of the extended outriggers, with a trailer body shown supported on a highway wheel assembly alongside the railroad car preparatory to transferring it onto the car.
Figure 4:
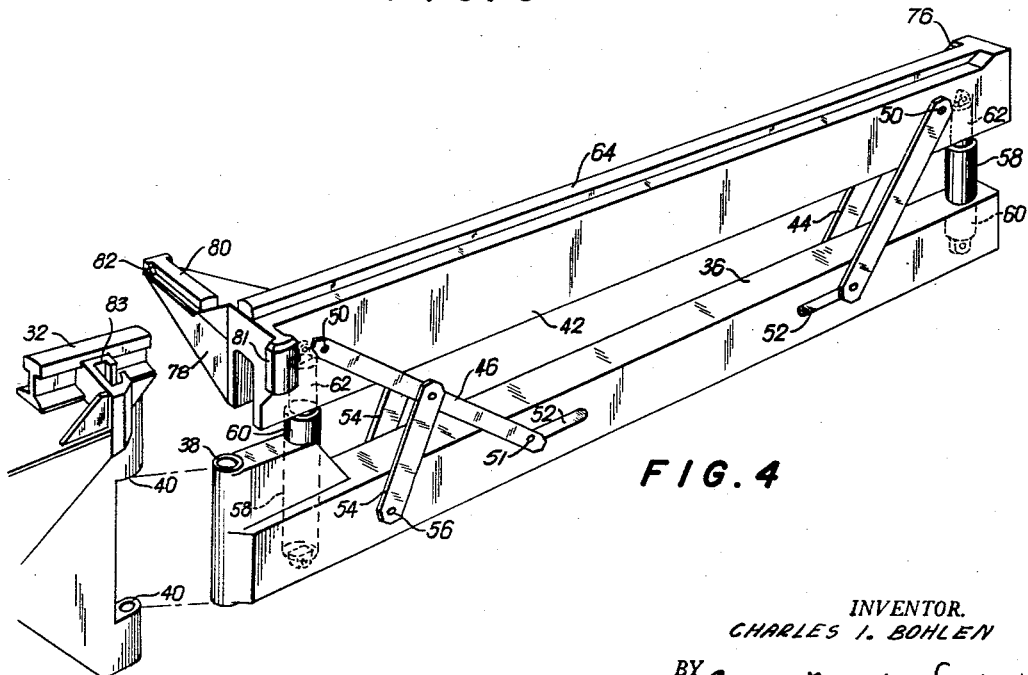
Figure 4 is an exploded isometric view of one of the outriggers and of a fragment of the railway car on which it is pivotally mounted.

As best shown in Figure 4, each of these outrigger assemblies 34 includes a lower beam 36 which has at its inner end a vertically extending tube 38 which is received in a yoke 40 at one side of the car 10 and is pivotally secured thereto by a pin (not shown). Extending above and parallel to the lower beam 36 is an upper beam 42 which is mounted for vertical movement relative thereto by means of links 44 at either side of the outer ends of the two beams and links 46 at their inner ends. The upper ends of the links 44 and 46 are pivotally connected to the upper beam 42 by means of bolts 50 while their lower ends carry pins 51 which extend slidably through longitudinal slots 52 in the lower beam 36. Pivotally attached to the center portions of the links 46 are the upper ends of links 54 whose lower ends are pivotally attached to the lower beam 36 by means of bolts 56. As will be understood, this "parallelogram" arrangement permits vertical movement of the upper beam 42 relative to the lower beam 36 while preventing longitudinal movement of the two beams relative to each other. To raise and lower the upper beam relative to the lower between the lower position shown in full lines in Figure 3 and the upper position shown in broken lines in that figure, a pair of double-acting hydraulic cylinders 58 are provided, one at each end of the outrigger assembly. The casing 60 of each of these hydraulic cylinders 58 is secured to the lower beam 36 while the ram 62 is secured to the upper beam 42.

To aid in supporting the outrigger assemblies, each of them, as shown in Figure 3, is provided near its outer end with a jack 66, the upper end of which is pivotally attached to the lower beam 36 and the lower end of which is adapted to rest upon the ground adjacent the railroad track. The pivotal attachement of the jack allows it to be swung up against the under surface of the beam 36, as shown in broken lines in Figure 3, when the outrigger assembly is folded against the side of the car. The height of the jack 66 is adjustable, for example by means of a screw (not shown), to accommodate different ground levels.

The upper beam 42 has at its upper surface an elongated rail 64 which extends the full length of the upper beam. When the outrigger assembly is in its extended position, the inner ends of these rails 64 abut the adjacent ends of the rails 32 on the railroad car 10 and form effective extensions thereof.

The upper beam 42 also has at its inner end a lateral extension 78 which projects generally at right angles to the long axis of the beam and which bears at its upper surface a stub rail 80 which is at the same height as the elongated rail 64. As best shown in Figure 2, when the outrigger assemblies are in their retracted positions, the inner ends of these stub rails 80 abut the adjacent ends of the rails 32 on the railroad car and form effective extensions thereof.

The inner ends of the upper beams are also provided with T-shaped key members 81 which slide vertically into conforming slots 83 at the side of the railroad car 10 when the upper beam 42 of a retracted outrigger assembly is raised to its upper position. This strengthens the support of the outrigger assembly in its retracted position.

As may be seen in broken lines at the right in Figure 3, the minimum transverse spacing between the rollers 30 of each of the two pairs of rollers on the trailer body 14 exceeds the length of the rails 32 on the railroad car 10 so that when the trailer body is laterally centered above the car, the rollers 30 at one side of the trailer body rest on the stub rails 80 of the retracted outrigger assemblies at one side of the car while the rollers 30 at the other side of the trailer body rest upon the elongated rails 64 of the extended outrigger assemblies 34 at the other side of the car. The elongated rails 64 and the stub rails 80 are respectively provided at their outer ends with stops 76 and 82 (Figure 4) to prevent the rollers 30 from rolling off these ends of the rails.

As may be seen in Figure 2, when the trailer body 14 is on the highway wheel assembly or "bogey" 68, a pair of angle members 70 which extend along the bottom of the trailer body (see also Figure 5) are in respective engagement with a pair of rails 72 at the top of the highway wheel assembly, and these members are locked together by means of retractable locking pins 74, as described more fully in the aforementioned copending applications. These locking pins are, of course, retracted when the trailer body is to be moved off the highway wheel assembly for transfer to a railroad car or other carrier.

When the outrigger assemblies are in their extended position, as shown at the lower left in Figure 2, they project beneath a trailer body which is parked alongside the track, with the rails 64 of the outrigger assemblies directly beneath the rollers 30 of the trailer body. To lift the trailer body 14 off of the highway wheel assembly, hydraulic fluid under pressure is supplied to the hydraulic cylinders 58 of the extended outrigger assemblies, raising the upper beams 42 thereof from the position shown in full lines in Figure 3 to that shown in broken lines, and causing the rails 64 of the upper beams 42 to engage the rollers 30 and raise the trailer body.

Figure 5:
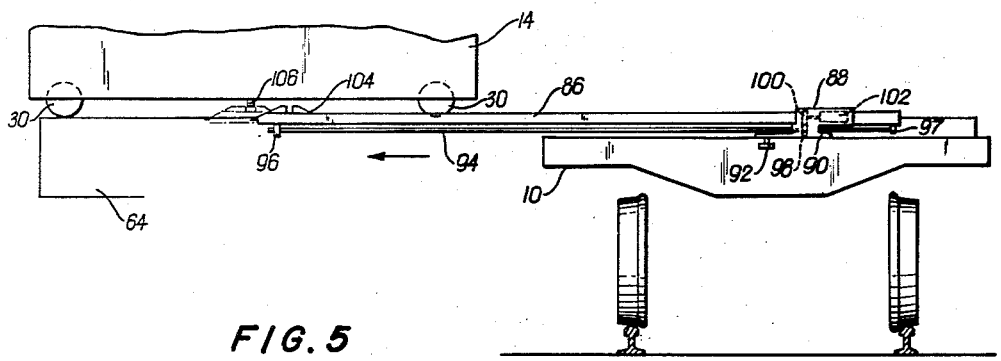
Figure 5 is a transverse sectional view taken through the railroad car adjacent the transfer assembly.
Figure 6:
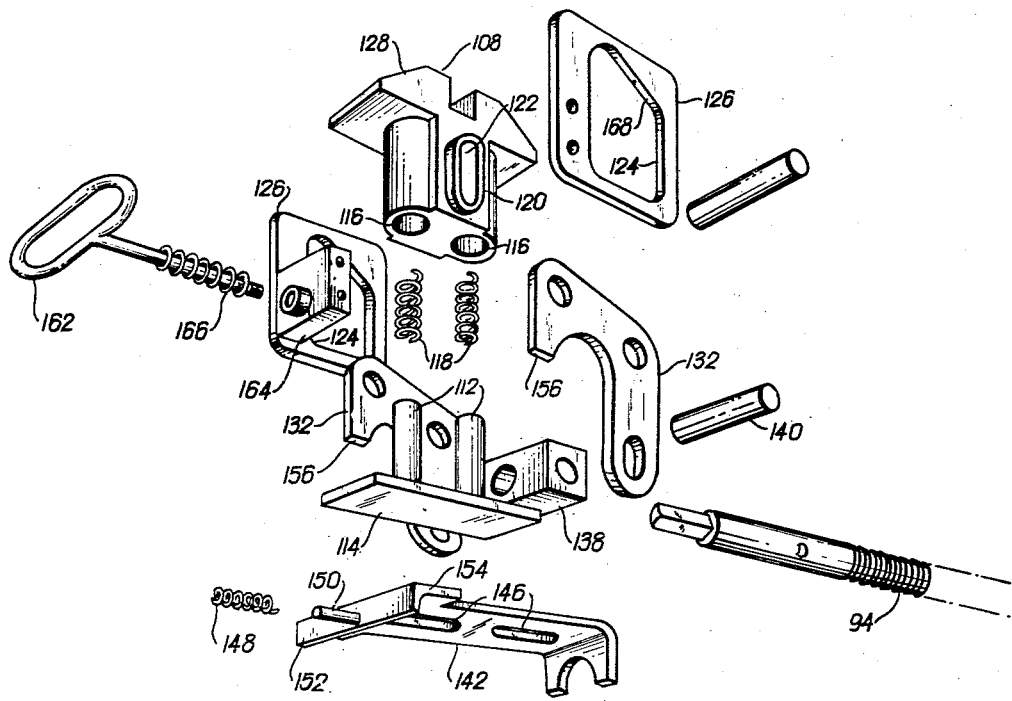
Figure 6 is an exploded view of the latch mechanism of the transfer assembly.

The mechanism for moving the trailer bodies transversely onto and off of the railroad car is shown in Figures 5 to 10 inclusive. As is shown generally in Figure 5, this mechanism includes an elongated transfer arm 86 which is supported for longitudinal sliding movement in a sleeve 88 projecting upwardly from a base 90, one end of which is pivotally attached to the railroad car 10 by a pin 92 so that the entire transfer assembly is rotatable in a horizontal plane relative to the car. When not in use, this transfer assembly is normally oriented so that the arm 86 is parallel to the long axis of the car, as shown in Figure 2. When it is desired to use the transfer assembly for moving a trailer body 14 onto or off of the car, the assembly is rotated so that the arm 86 extends perpendicularly of the car, as shown in Figure 5.

For moving the arm 86 longitudinally relative to the sleeve 88, a lead screw 94 is provided, this lead screw extending along the bottom of the arm 86 for substantially its full length and being supported and held against rotation by means of brackets 96 and 97 projecting downwardly from either end of the arm. This lead screw threadably engages a nut 98 which is rotatably supported in the base 90 while being held against longitudinal movement. This nut 98 is driven by a spur gear 100 fixed on the shaft of a hydraulic motor 102 supported in the base 90, or other suitable power means. When hydraulic fluid under pressure is supplied to the motor 102, the nut 98 is rotated in the appropriate direction to drive the lead screw 94 and the arm 86 longitudinally in the desired direction.

Figure 7:
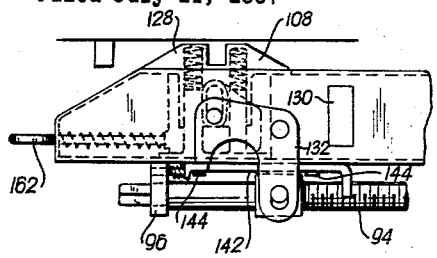
Figure 8:
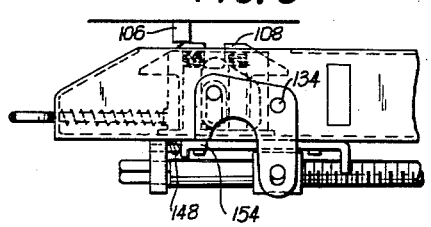

At the outer end of the arm 86 is a latch assembly 104 which is adapted for releasable engagement with a tab 106 projecting downwardly from the bottom of the trailer body 14. The construction of this latch assembly 104 can best be understood by study of the exploded view of Figure 6 in conjunction with Figures 7 to 10, which show the latch assembly under various conditions of operation. As may be seen in these figures, the latch member 108 is provided at its upper surface with a notch 110 which is adapted to receive the tab 106 on the bottom of the trailer body 14. The latch member 108 is mounted for vertical sliding movement on a pair of posts 112 which project upwardly from a base plate 114 fixed on the transfer arm 86, these posts being slidably received in holes 116 in a depending portion of the latch assembly 104. Coil springs 118 are compressed between the upper ends of these posts 112 and the upper ends of the holes 116 to urge the latch member 108 upwardly to the normal extended position in which it is shown in Figure 7. Further upward movement of the latch member 108 is prevented by means of flanges 120 projecting outwardly from either side of the latch member 108 around an oval opening 122 which extends through the latch member, these flanges engaging the upper ends of trapezoidal openings 124 in the cam plates 126 at either side of and within the transfer arm 86. The transfer arm 86 is mounted at such a level that when the latch member 108 is in this normal extended position, it will engage the depending tab 106 on the bottom of the trailer body 14 as the transfer arm is moved outwardly beneath the trailer body. The upper surface of the latch member 108 is provided with inclined surfaces 128 at either side of the notch 110, so that when the latch member thus engages the tab 106, the latch member will be cammed downwardly against the resistance of the springs 118, as shown in Figure 8, until the notch 110 comes into alignment with the tab 106, whereupon the springs 118 will urge the latch member 108 again outwardly into interlocking engagement with the tab.

When the transfer arm 86 has thus engaged the trailer body 14, the fluid motor 102 (Figure 2) may be driven in the opposite direction to move the transfer arm 86 inwardly again and pull the trailer body 14 along the rails 64 of the outrigger assemblies and the rails 32 of the railroad car until the trailer body 14 is centered over the railroad car as shown in broken lines in Figure 3.

When the trailer body reaches this position, its further movement is stopped by engagement of the rollers 30 on the leading side of the trailer body with the stops 82 on the stub rails 80 on the far side of the railroad car 10. Simultaneously, a stop block 130 projecting from one side of the transfer arm 86 comes into engagement with the adjacent end of the sleeve 88, preventing further movement of the arm 86. However, the motor 102 (Figure 5) will continue to drive the nut 98 and move the lead screw 94 for a short distance. The lead screw is permitted this longitudinal movement relative to the transfer arm 86 by virtue of the fact that the ends of the lead screw 94 are longitudinally slidable in the brackets 96, 97, although the ends are of square cross-sectional shape and are keyed against rotation relative thereto.

A pair of crank members 132 which are pivotally secured at opposite sides of the transfer arm 86 about pins 134 are provided at their lower ends with slots which engage opposite ends of a pin 136 which extends through a spacer block 138 on the lead screw 94 and through the lead screw itself. As the lead screw continues its movement to the right, the crank members 132 are rocked in a counterclockwise direction, as viewed in Figure 9, about their pivots 134. This causes a pin 140 which extends between the crank members and through the oval opening 122 in the latch member 108 to move downwardly, pulling down the latch member 108 against the resistance of the springs 118, as shown, in Figure 9, and disengaging the latch member 108 from the tab 106 on the trailer body 14. With the latch member 108 thus disengaged from the tab 106 on the trailer body 14 the transfer assembly may be rotated to its longitudinal position as shown in Figure 2.

Figure 9:
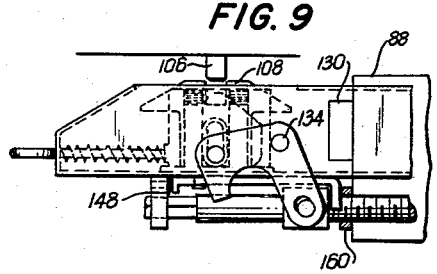

Accidental unlocking movement of the crank members 132 due to friction between the transfer arm 86 and the sleeve 88 or to other causes is normally prevented by means of a locking plate 142 which is slidably secured on the undersurface of the transfer arm 86 by means of headed rivets 144 whose shanks extend slidably through slots 146 in the locking plate 142. The locking plate 142 is normally urged toward the right, as shown in Figure 7, by means of a coil spring 148 which is supported on a pin 150 projecting from the outer end of the locking plate 142 and which is compressed between a flange 152 on the locking plate and the bracket 96 on the transfer arm 86. When the locking plate 142 is in this normal position, locking tabs 154 at either side of the plate are positioned beneath projections 156 on the crank members 132 to prevent unlocking movement of the crank members. However, as the transfer arm 86 nears its extreme right-hand position, as shown in Figure 9, a flange 158 at the inner end of the locking plate comes into engagement with a collar 160 on the adjacent end of the sleeve 88, limiting further movement of the locking plate 142 to the right. As the transfer arm 86 continues its movement to the right, the spring 148 is compressed and the relative movement between the locking plate 142 and the transfer arm 86 will cause the locking tabs 154 of the locking plate 142 to clear the projections 156 on the crank members 132 and free the crank members for unlocking movement, as shown in Figure 9.

Figure 10:
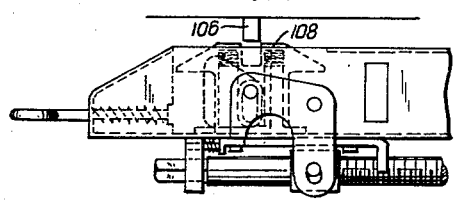

The latch assembly is also provided with a handle 162 by which the latch member 108 can be retracted at any time, for example after the trailer body 14 has been moved outwardly over the highway wheel assembly and when it is desired to disengage the latch member from the tab 106 so that the transfer assembly may be rotated from beneath the trailer body 14 prior to lowering the trailer body onto the highway wheel assembly 68. This handle 162 projects through the outer end of the transfer arm 86 and its inner end is secured to a block 164 which extends between and is attached to the two cam plates 126. A spring 166 which is supported on the shank of the handle 162 and is compressed between the block 164 and the end of the transfer arm 86 normally maintains the spacer block 164 and the cam plates 126 in an inner position, in which they are shown in Figures 7 and 9, and at which the flanges 120 on the latch member 108 are at the upper most portions of the trapezoidal openings 124 in the cam plates. Pulling of the handle 162 outwardly against the resistance of the spring 166 causes movement of the cam plates 126 to the left, as shown in Figure 10, causing the inclined surfaces 168 at the upper end of the trapezoidal openings 124 to engage the flanges 120 and cam the latch member 108 downwardly out of engagement with the tab 106.

Figure 11 shows the control system for the hydraulic cylinders 58 which raise and lower the upper beams 42 of the outrigger assemblies 34. In this figure, the reference numerals 58a to 58d, inclusive, represent the four hydraulic cylinders which control the upper beams of the two outrigger assemblies at one side of one end of the car 10, while the numerals 58e to 58h, inclusive, represent the four cylinders which control the upper beams of the two outrigger assemblies at the other side of this end of the car. All of these cylinders are conventional double-acting hydraulic cylinders—that is they are power driven both to raise and lower the beams. The arrangement is such that the upper beams of all four outrigger assemblies at one end of the car are raised and lowered simultaneously and at the same speed. A hydraulic pump 170 driven by an electric motor (not shown) receives hydraulic fluid from a sump 172 and normally supplies the same under pressure to a pressure line 176 through a valve 174, as indicated in full lines in Figure 11. The valve 174 may be turned to the position indicated in broken lines to take the load off the pump for starting of the driving motor. Connected in parallel with the valve 174 is a pressure-limiting check valve 178.

The pressure line 176 is connected to two four-way valves 180 and 182 which are arranged for simultaneous operation by single manually operated handle. When the valves 180 and 182 are set in the position indicated in full lines, the pressure fluid in the line 176 is connected to the lower ends of each of the cylinders through the matched flow-control valves 184 and the check valves 186 while the upper ends of the cylinders are connected through an exhaust line 188 with the sump 172. Thus the upper beams 42 of the four outrigger assemblies 34 at one end of the car 10 will be raised in synchronism.

When the control handle is moved to the other position, the four-way valves 180 and 182 will be set in the position indicated in broken lines, in which position the pressure fluid in the line 176 will be connected to the upper ends of each of the eight cylinders 58, while the lower ends of each of these cylinders are connected through the other check valves 189 and matched flow-control valves 184 to the exhaust line 188 and sump 172. Thus, the upper beams 42 and rails 64 of all four of the outrigger assemblies 34 at one end of the car will be synchronously lowered.

As indicated by the arrows at the right-hand side of Figure 11, the pressure line 176 and exhaust line 188 are also connected to a similar set of valves which control the supply of pressure fluid to the eight cylinders 58 which actuate the four outrigger assemblies at the other end of the car, and to the valve which controls the supply of pressure fluid to the motor 102 of the transfer arm 86.

When it is desired to transfer a loaded trailer body from a highway truck tractor and wheel assembly to a railroad car, the tractor is used to pull the trailer alongside of and parallel to the railroad car as indicated in broken lines in Figure 2, and the latching pins 74 which normally lock the trailer body on the highway wheel assembly are retracted. Then the two adjacent outrigger assemblies 34 are swung outwardly into extended position, as shown at the lower left in Figure 2, at which position they project beneath the trailer body 14. The jacks 66 (Figure 3) are then swung downwardly and adjusted so that they rest upon the ground and furnish support for the outer ends of the outrigger assemblies, as shown in full lines. Then the four-way valves 180 and 182 (Figure 11) are actuated to furnish fluid under pressure to the lower ends of the cylinders 58 and raise the upper beams of all four of the outrigger assemblies 34 at the appropriate end of the car. As the upper beams 42 of the extended outrigger assemblies 34 move to their upper position, as shown in broken lines at the left in Figure 3, the rails 64 thereon engage the rollers 30 beneath the trailer body 14 and raise the trailer body 14 so that the angle members 70 on the bottom of the trailer body are lifted off of the rails 72 on top of the highway wheel assembly 68. Then the transfer arm 86 is swung transversely of the car and pressure fluid is supplied to the fluid motor 102 (Figure 5) to drive it longitudinally under the trailer body 14 until the latch assembly 104 comes into engagement with the tab 106 beneath the trailer body.

Then the fluid motor is reversed to pull the transfer arm and the trailer body with it in the opposite direction with the rollers 30 on the trailer body rolling along the rails 64 on the extended outrigger assemblies, and with the rollers on the leading side of the trailer body rolling from the rails 64 onto the rails 32 on top of the car and finally onto the stub rails 80 of the retracted outrigger assemblies at the far side of the car, which were raised simultaneously with those of the extended outrigger assemblies on the near side of the car. When the railroad car reaches this position, the latch assembly 104 is automatically disengaged from the tab 106 on the trailer body and the transfer arm may be swung around parallel to the railroad car as shown in Figure 2.

Then the valves 180 and 182 (Figure 11) are actuated to lower the upper beams 42 and rails 64 of all four of the outrigger assemblies 34 simultaneously, lowering the trailer body 14 so that the angle members 70 come into engagement with rails 194 which are mounted on a longitudinally slidable frame 196 at the top of the intermediate section 22 of the railroad car. Then the latching pins in the rails 194 are released to project through openings in the vertical flanges of the angle members 190 and lock the trailer body in position on the railroad car for transit.

As the trailer body 14 is lowered onto the railroad car, the king pin 202 which depends downwardly from the forward end of the trailer body is received between a pair of bars 204 which extend along the upper surface of the end platform 20 of the railroad car. These bars 204 confine the king pin and help prevent lateral and rotational movement of the trailer body relative to the railroad car. However, the elongated slot defined between them accommodates king pins on trailer bodies of widely varying overall length.

As shown in Figure 3, the two ends of the table 196 on which the rails 194 are mounted is attached by arms 198 to opposite ends of two shock absorbers 200 whose casings are secured to the sides of the railroad car. These shock absorbers 200, which, for example, may be of the "ring-spring" type, permit a limited movement of the table 196 and the trailer bodies 14 thereon relative to the car, to absorb road shocks and acceleratory forces.

To transfer the trailer body 14 from the railroad car 10 to the highway wheel assembly 68 the above described steps are merely reversed.

From the foregoing description, it will be appreciated that the present invention provides practical apparatus for effecting transfer of trailer bodies between highway wheel assemblies and railroad cars, the transfer being made by lateral movement of the car so that only a limited space is required at one side of the railroad car. It will thus be appreciated that the aforementioned and other desirable objects have been achieved. However, it should be emphasized that the particular embodiment of the invention which is shown and described herein is intended as merely illustrative of the principles of the invention rather than as restrictive of the scope thereof, and that the effective coverage of this patent is limited only by the appended claim.

I claim:

In a system for transferring trailer bodies between highway wheel assemblies and railway cars, a trailer body having at its under side two longitudinally spaced pairs of transversely spaced rollers arranged to support said trailer body for transverse rolling movement, a railway car having at its upper surface a pair of parallel, transversely extending rails spaced for respective support of said sets of rollers, each of said rails extending at least the full width of said car, but the length of said rails being less than the minimum transverse spacing between the said pairs of rollers; a pair of outrigger assemblies at each side of said car, each of said outrigger assemblies being pivotally mounted for swinging movement in a generally horizontal plane between a retracted position longitudinally of and adjacent the side of said car and an extended position at which they extend parallel to each other and transversely of said car beneath a trailer body supported on a wheel assembly at one side of said car, and each said outrigger assembly including a base member with a retractable jack supporting its outer end relative to the ground in the extended position of said outrigger assemblies, and each said outrigger assembly also including an upper member mounted above and generally parallel to said base member for vertical movement relative thereto and having on its upper surface on elongated rail extending longitudinally of said outrigger assembly and a stub rail with its upper surface in the same horizontal plane as that of said elongated rail with said stub rail extending generally perpendicularly to said elongated rail, the inner ends of the latter said rails being spaced and arranged so that in the extended and retracted position of said outrigger assemblies respectively, said elongated rails and said stub rails form continuations of the rails on said car whereby said trailer body may be rolled transversely into centered position above said car at which the rollers at the leading side of said trailer body are supported on the stub rails of the retracted outrigger assemblies on one side of the car and the rollers at the trailing side of the trailer body are supported on the elongated rails of the extended outrigger assemblies at the other side of the car, the upper members of the outrigger assemblies being vertically movable between an upper position at which the rails thereon are at the same level as the rails on the car and a lower position at which the rails on said upper members are clear of the rollers of the trailer body resting on the upper surface of said car to permit the outriggers to be swung against the sides of the car, and power means for raising the upper members of the outrigger assemblies at both sides of said car in synchronism to the upper position.

References Cited in the file of this patent

UNITED STATES PATENTS

| | | |
|---|---|---|
| 1,657,076 | Fitch | Jan. 24, 1928 |
| 1,797,601 | Barr | Mar. 24, 1931 |
| 1,860,746 | McLaughlin | May 31, 1932 |
| 1,883,538 | Bywater | Oct. 18, 1932 |
| 2,058,891 | Kellett | Oct. 27, 1936 |
| 2,285,207 | Johnson | June 2, 1942 |
| 2,538,531 | Likens | Jan. 16, 1951 |
| 2,650,731 | Adler | Sept. 1, 1953 |
| 2,808,289 | Scoby | Oct. 1, 1957 |

FOREIGN PATENTS

| | | |
|---|---|---|
| 528,037 | Canada | July 24, 1956 |